G. S. FABER.
HUMIDIFYING APPARATUS.
APPLICATION FILED JULY 3, 1918.
1,293,742.
Patented Feb. 11, 1919.
2 SHEETS—SHEET 1.
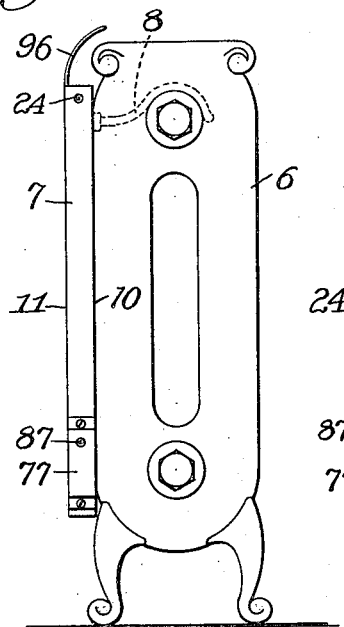
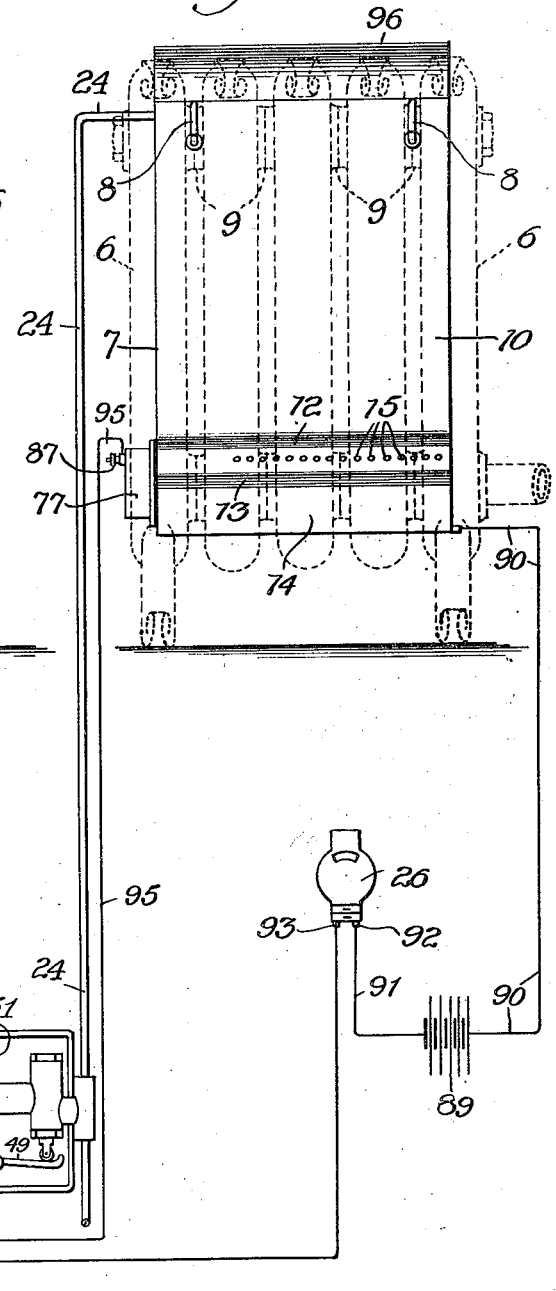

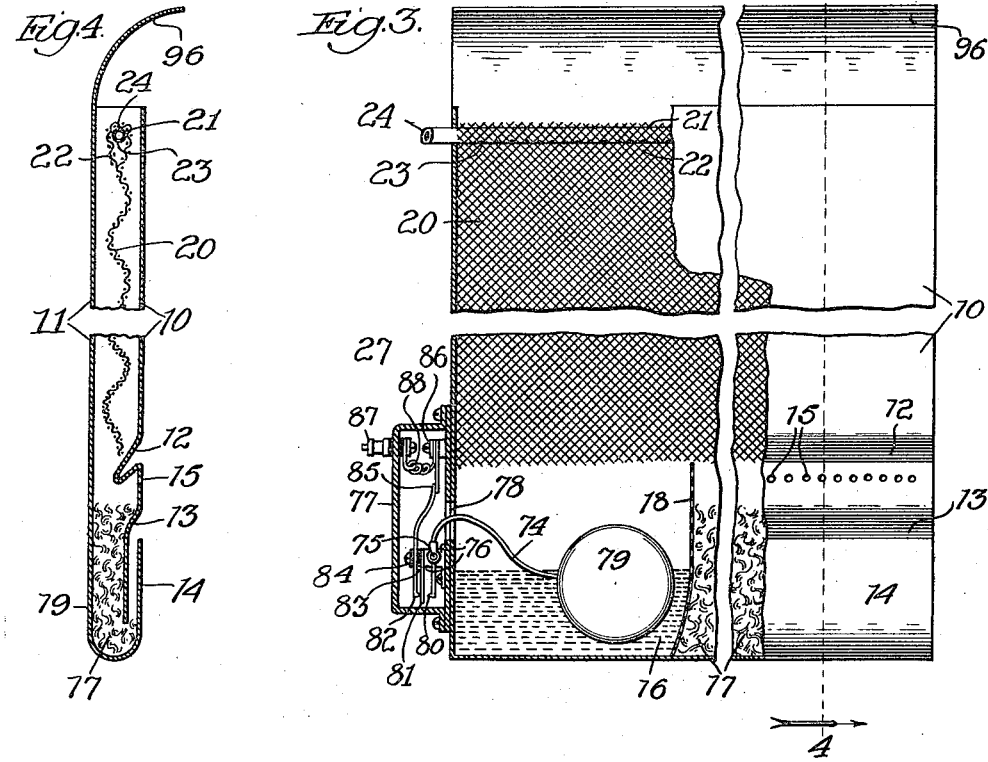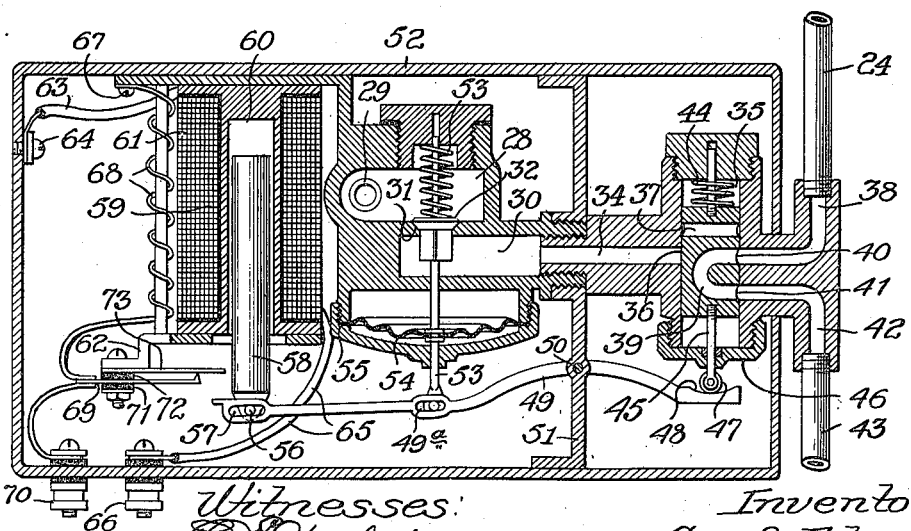

UNITED STATES PATENT OFFICE.

GUY S. FABER, OF NEW YORK, N. Y., ASSIGNOR OF ONE-HALF TO SIDNEY S. SCHMIDT, OF NEW YORK, N. Y.

HUMIDIFYING APPARATUS.

1,293,742.    Specification of Letters Patent.    Patented Feb. 11, 1919.

Application filed July 3, 1918.   Serial No. 243,174.

*To all whom it may concern:*

Be it known that I, GUY S. FABER, a citizen of the United States, residing at New York, in the county of New York and State of New York, have invented a new and useful Improvement in Humidifying Apparatus, of which the following is a specification.

My invention relates, more particularly to humidifying apparatus for use, especially in connection with steam, or hot water, radiators, for maintaining a desirable amount of moisture in the room or rooms, heated by the radiator.

My primary object is to provide a new and improved construction of vaporizing pan which shall operate in a very effectual manner to expose water supplied thereto, to the heat of the radiator for vaporizing it and discharging the maximum amount of moisture into the room commensurate with the amount of heat given off by the radiator, and to provide against leakage of the water from the vaporizing pan either by dropping from the vaporizing surface of the pan, or by overflow.

Referring to the accompanying drawings:

Figure 1 is a view somewhat in the nature of a diagram, of a radiator equipped with my improved vaporizing pan shown as forming an element of a system for controlling the humidity in the air, the radiator being shown by dotted lines. Fig. 2 is a view in end elevation of the radiator shown in Fig. 1 with my improved vaporizing pan mounted thereon. Fig. 3 is a broken, enlarged, view in longitudinal, vertical elevation of my improved vaporizing pan. Fig. 4 is a broken section taken at the line 4 on Fig. 3 and viewed in the direction of the arrow; and Fig. 5, a view in vertical elevation of electrically-operated mechanism forming a portion of the equipment, for controlling the supplying of water to the vaporizing pan and the draining of the latter.

In the drawings, a radiator, either steam or hot water, is illustrated at 6, this radiator being equipped with a water-vaporizing pan 7 constructed in accordance with my invention, which, by preference, is adapted to be supported along the rear side of the radiator, as represented in Fig. 2, as through the medium of forwardly-projecting hooks 8 secured to the pan and hooked over the adjacent circular bosses commonly provided on steam radiators. By preference, the pan 7 is of general rectangular form as shown, its opposite front and rear walls 10 and 11 being spaced apart a relatively slight distance only, with the pan closed at its bottom. The metal forming the side 11 is bent forwardly and upwardly to form the curved bottom of the pan and terminates above the bottom of the pan, as shown in Fig. 4. The metal forming the side 10 of the pan is deflected inwardly throughout the length of the pan, as represented at 12, to form a ledge extending preferably across the center of the pan, as shown in Fig. 4, and its lower portion deflected, as represented at 13, to be spaced from the up-turned portion 14 of the metal forming the rear wall 11, with the lower edge of the portion 13 reaching short of the bottom of the pan. The portion of the wall 10 between the deflected portions 13 and 14 is perforated, as represented at 15, preferably throughout the length of the pan. The compartment thus provided in the bottom of the pan is divided into two compartment sections 16 and 17, by means of a perforated partition 18, the compartment 16 operating as a float chamber, as hereinafter described, and the compartment 17 being provided for receiving an absorbent material, as for example metallic wool, represented at 19 and which extends preferably slightly below the line of apertures 15. The pan also contains a surface over which the water to be vaporized is spread to present a relatively wide surface to the heat radiated from the radiator. This surface, by preference, is formed of wire mesh represented at 20 which embraces, and is supported by, a pipe 21 secured in the upper end of the pan and extending throughout the length of the latter. The wire mesh 20, which preferably extends substantially the full length of the pan and is of convoluted form, as shown in Fig. 4, is looped about the pipe 21, as shown in Fig. 4, and into the looped portion 22 and the screen thus provided, water admitted to the pipe 21, discharges through downwardly-opening perforations contained in the underside of the pipe, preferably at spaced intervals throughout its entire length.

In accordance with the system shown in the drawings, water is supplied to the pipe 21 for discharge therethrough upon the screen 20 for subjection to the heat of the radiator to vaporize it through a pipe 24 which, in the particular arrangement illustrated, extends downwardly to an electrically-controlled apparatus represented at 25, and which may be located in the basement of the building, for controlling the supplying of water to the vaporizing pan under variations in the moisture content of the air.

The apparatus shown is designed to be operated only when heat is in the radiator and the moisture content of the air has dropped below a certain degree, the apparatus involving any suitable form of hygroscopic device in the room in which the radiator is located and which is represented diagrammatically at 26. The hygroscopic device would be provided with electrical contact making-and-breaking devices operating to close the circuit through the hydrostat when the moisture surrounding it becomes reduced below a certain degree and to break the circuit when the moisture content reaches a certain degree. The apparatus also involves a thermostatic switch represented at 27, which is subject to the heat of the radiator and which, when the radiator is hot, is caused to close the circuit at this point, this device 27 being shown in connection with a float-controlled switch-device coöperating with the pan 7.

The apparatus represented at 25 comprises a chamber 28 in connection at 29 with a supply of water under pressure, as for example the usual service pipes in houses, a second passage 30 communicating with the passage 28 through a port 31 controlled by a valve 32, which is normally closed under the action of a spring 33, the passage 30 communicating with a passage 34 opening into a cylinder 35 containing a slide valve 36 presenting a cross port 37 adapted to be moved into and out of registration with the passage 34, and a passage 38 in the cylinder wall 35 and in communication with the pipe 24. The piston 36 also contains a U-shaped port 39 which is adapted to register at its open ends 40 and 41 with the passage 38 and a passage 42 which connects with a pipe 43, which, in practice, would lead to a drain, such as a sewer. The valve 36, which is backed up by a coiled spring 44 tending to move the valve downwardly, operates when the valve is raised, as shown in Fig. 5, to connect the pipe 24 with the pipe 43 through the passage 39 and when in lowered position to disconnect these pipes, and through the medium of a port 37, connecting the passage 34 with the pipe 24, for supplying water to the vaporizing pan. The valve 36 is provided at its lower end with a stem 45 guided in an opening in a cap-plate 46 on the casing in which the valve 36 reciprocates, the lower end of this rod, which carries a roller 47, bearing against the upper, curved, surface 48 of a lever 49 fulcrumed at 50 on a partition 51 formed as a part of the casing 52 in which the mechanism now being described is located. The lever 49 at the side of its pivot 50, opposite that at which it is engaged by the roller 47, is pivotally connected, as indicated at 49ª, with the lower end of the stem 53 of the valve 32, this stem being equipped with a flexible plate 54 held tightly at its edges 55 and operating to prevent leakage. Beyond the pivotal connection 49ª of the lever 49 with the stem 53, this lever is pivotally connected through the medium of a pin 56 extending into a slot 57 in this lever, with the core of a solenoid device 59, the pin 56 being on the lower end of the core. The core 58 is movable up and down in the space 60 surrounded by the solenoid coil 61, which is supported from a bracket 62 carried by the casing 52. The terminal 63 of the solenoid is grounded on the casing 52, as indicated at 64, and its other terminal 65 is connected with the binding-post 66. Grounded on the casing 52 at one end, as indicated at 67, is a resistance coil 68, its other terminal being connected with a contact spring 69 electrically connected with the binding-post 70, and supported from the bracket 62 between two strips of insulation 71 and 72, the contact spring 69 coöperating with a spring contact strip 73, which is in electrical contact with the bracket 62 and thus grounded and is insulated from the contact 69 by the insulation 72, this resistance coil operating for a purpose hereinafter described. The circuit controlling-mechanism 27 comprises a lever 74 pivoted at 75 on a stud 76 secured to one end of the vaporizing pan and located within a supplemental casing 77. The lever 74 extends into the lower portion of the vaporizing pan through an opening 78 which is located above the highest level of water in the pan, to prevent water floating into the supplemental casing 77, this lever being equipped with a float 79. The lever 74 is provided with a depending arm 80 which coöperates with a contact 81 of springy material secured to the stud 76 and thus grounded on the radiator, the contact 81 coöperating with a contact 82 secured on this stud, but insulated therefrom through the medium of the insulating sections 83 and 84, the upper end of the contact 82 extending into a position for coöperation with a thermostatically-controlled contact 85 secured to, but insulated from, a stud 86, secured to the pan. The contact 85, which is connected with the binding-post 87 by a wire 88, is so constructed, as is well known in the art, and is so positioned relative to the upper end of the contact 82 that when the radiator is hot, it will be caused to be in engagement with the contact 82, as shown in Fig. 3, but when the radiator is cold, it will be spaced therefrom, interrupting the circuit at this point. As shown, the source of electrical energy for controlling the operation of the automatic mechanism, is a battery represented at 89, one terminal of this battery being connected, by means of the wire 90, with a portion of the pan, as indicated in Fig. 1 and thus grounded and in electrical connection with the contact 81. The other terminal 91 of the battery connects with one of the terminals 92 of the hydrostat 26, the other terminal 93 of the hydrostat being connected, by means of the wire 94, with the binding-post 70. A wire 95 connects the binding-post 66 with the binding-post 87.

The operation of the apparatus is as follows:

The apparatus is shown in the drawings in the position it assumes when the room in which the radiator is located is heated, the air in the room is charged with the amount of moisture provided as the maximum by the hydrostat, and the trough-shaped bottom of the vaporizing pan is charged with water. In this condition of the apparatus, the valve 36, by reason of the weight imposed by the core 58 (the solenoid 59 being deënergized) is in the position shown in Fig. 5 in which the supply of water to the pipe 24 is shut off and the pipe 24 is opened to the drain 43, the valve 32 also closing the passage 28 to the passage 30, the water in the pipe 24 in this position of the mechanism draining therefrom through the pipe 43. When the moisture in the room in which the hydrostat 26 is located, drops below a predetermined per cent., the circuit is closed in the hydrostat and if the water is low in the vaporizing pan, the circuit is closed between the contacts 81 and 82, which are in series with the hydrostat 26. When these conditions occur, current is caused to traverse the solenoid coil which lifts the core 58 rotating the lever 49 in a clockwise direction in Fig. 5, which opens the valve 32 and lowers the valve 36 to a position in which the passage 34 and pipe 24 are in communication. Water from the supply pipe thus flows through the passages 28, 30, and 34 and through the pipe 24 and downwardly through the perforations 23 in the pipe 21 upon the screen 20 where it is subjected to the heat of the radiator, thereby becoming vaporized and discharged into the atmosphere in the room in which the radiator is located, the pan, by preference, being provided at its upper end with a forwardly extending deflector 96 to deflect the moist air in a forward direction.

It will be noted that by the construction of vaporizing pan employed, ample provision is made for the circulation of air from the bottom upwardly through the pan and out through the upper, open, end of the latter, whereby the maximum charging of air with moisture may be effected.

In the operation of the apparatus as just stated, current flows from the battery 89, through wire 91, hydrostat 26, wire 94, binding-post 70, contact 69, contact 73 to ground, thence through solenoid coil 61, binding-post 66, wire 95, binding-post 87, wire 88, contact 85, contacts 82 and 81 to ground on the vaporizing pan, and from the pan through the wire 90 to the battery 89.

In the operation of the lever 49, as above stated, under the action of the solenoid 61 when energized, the end of this lever engages the spring contact 73, lifting it free from the contact 69 whereupon the current instead of passing from the contact 69 direct to ground through the contact 73, traverses the coil 68 thus caused to be in series with the solenoid coil 61 and which by being properly proportioned, as is well understood in the art, prevents the burning out of the coil 61.

When the moisture to which the hydrostat 26 is subjected exceeds the degree at which the latter operates to break the circuit, the circuit is broken through the hydrostat, thus permitting the parts of the mechanism shown in Fig. 5 to return to the position shown in this figure, wherein the supply of water to the water vaporizing pan is arrested and the pipes 24 and 21 automatically drained. Also should the water in the pan rise therein above a given level, the float 79 operating on the lever 74 causes its finger 80 to move in a direction for permitting the spring contact 81 to spring apart from the contact 82.

It will be noted from the foregoing description that by the provision of the electrically-controlled devices referred to, the danger of freezing of the water in the system is prevented, as the water is drained from the system in the event that the current is broken at the contacts 82 and 85. Furthermore, it will be noted that water will not be supplied to the vaporizing pan unless three factors are present, namely the radiator must contain heat, second, the air surrounding the hydrostat 26 must contain moisture below a given degree, and third, the water in the pan must be below the maxium water-level. Thus adequate provision is made against overflowing of the system under the different conditions presented and, by providing a hydrostat, which may be set at different degrees of moisture, the air may be caused to be impregnated with the amount of moisture desired.

It may be further stated as regards the vaporizing pan that by constructing the bottom of the pan, as explained, leakage of the water from the pan by dripping from the screen, is prevented.

The material represented at 19, which is hereinbefore stated to be an absorbent material, as for example mineral wool, is preferably any suitable material readily conductive of heat and affording a large surface, as is the case with mineral wool, in order that the rapid evaporation of water dropping from the lower end of the screen 20, be effected.

Also when desired, the screen may be coated with any suitable porous substance such as pumice stone with a post-binder of any suitable kind, filled into the spaces between the wires.

While I have illustrated and described a particular construction embodying my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. A water-vaporizing pan comprising a casing open to the atmosphere and forming at its lower end a water receptacle with an air-inlet opening between the opening in the top of the casing and said water receptacle, a member in said casing extending short of the bottom thereof and presenting a water-vaporizing surface of relatively great area, means for directing water upon said member, and an inwardly-projecting ledge on said casing extending beneath the lower edge of said member and arranged to extend into the path of the water dripping from said water-vaporizing surface and preventing the water from passing out through said air-inlet opening.

2. A water-vaporizing pan comprising a casing containing an opening in its top and forming at its lower end a water receptacle, a member in said casing extending short of the bottom thereof and presenting a water-vaporizing surface of relatively great area, means for directing water upon said member, and an inwardly-projecting flange on the inner wall of said casing arranged to extend into the path of the water dripping from said water-vaporizing surface, said casing being open to the atmosphere at a point below that at which said flange is connected with said casing, whereby water is prevented from passing out through the last referred to open portion of the casing.

3. A water-vaporizing pan comprising a casing open to the atmosphere and forming at its lower end a water receptacle, a member in said casing presenting a water-vaporizing surface of relatively great area, and means for directing water upon said member, said casing being open to the atmosphere at a point above the lower extremity thereof and provided adjacent said opening with a depending flange which extends downwardly into the said water receptacle and is spaced from the adjacent wall of the latter containing said opening.

4. A water-vaporizing pan comprising a casing open at its top and forming at its lower end a water receptacle, said casing being open to the atmosphere above its lower extremity and containing a depending partition which extends into said receptacle and is spaced from the adjacent wall thereof, said casing also being in communication with the atmosphere above said partition and being equipped with an inwardly projecting ledge, a member in said casing extending short of the bottom thereof presenting a water-vaporizing surface of relatively great area, and means for directing water upon said member.

5. A water-vaporizing pan comprising a casing, one of the walls of which is formed of a sheet of metal having an upturned section which forms a portion of the opposite wall of the casing, the said opposite wall of the casing being formed of a sheet of metal bent to provide an inwardly projecting ledge and a deflected section spaced from the said upwardly bent section to present a partition extending above the bottom of the casing and spaced from the inner-side and the top of said upwardly bent section, the casing side equipped with said ledge containing openings between said ledge and the opening provided between the partition and said upwardly bent section, and a member in said casing presenting a water-vaporizing surface of relatively great area, and means for directing water upon said member.

6. A water-vaporizing pan comprising a casing containing an opening in its top, a member in said casing, means for directing water against the upper portion of said member, the bottom of said casing being closed and said member forming a water-vaporizing surface of relatively great area, and a mass of heat-conducting material in the bottom of said casing presenting a relatively great area and operating to receive water dropping from the lower end of said member.

7. A water-vaporizing pan comprising a casing containing an opening in its top, a member in said casing, means for directing water against the upper portion of said member, the bottom of said casing being closed and said member forming a water-vaporizing surface of relatively great area, and a mass of mineral wool in the lower part of said casing operating to receive water dropping from said member.

GUY S. FABER.